S. V. DUSSEAU.
COMBINED DRIVING AND STEERING WHEEL FOR AUTOMOBILE AXLES.
APPLICATION FILED JULY 27, 1908.
926,929.
Patented July 6, 1909.
3 SHEETS—SHEET 1.
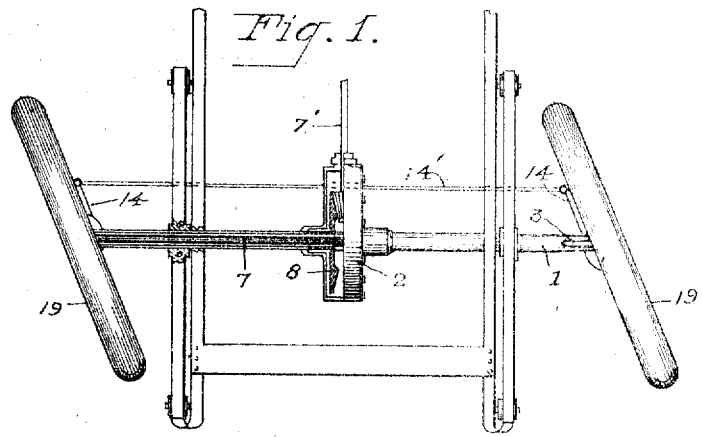
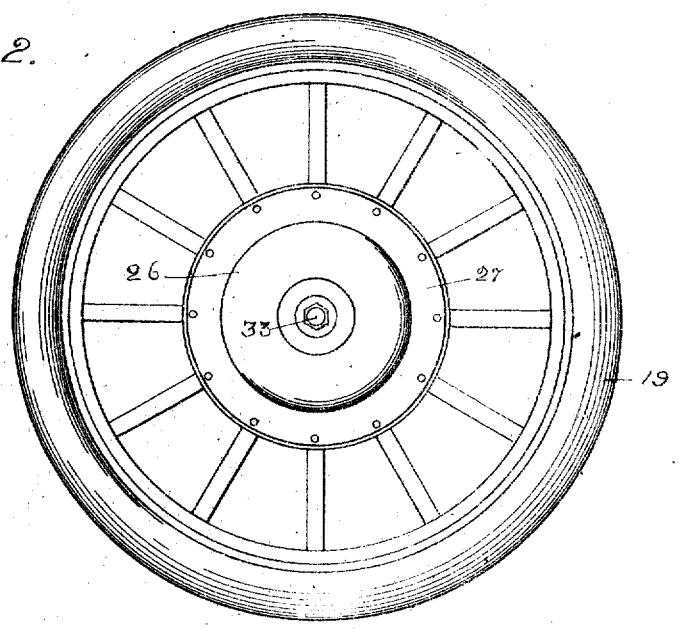
Witnesses.
Richard R. Watson
M. S. Smith
Inventor.
Silas V. Dusseau
by R. & B. Wilson
his Attorney

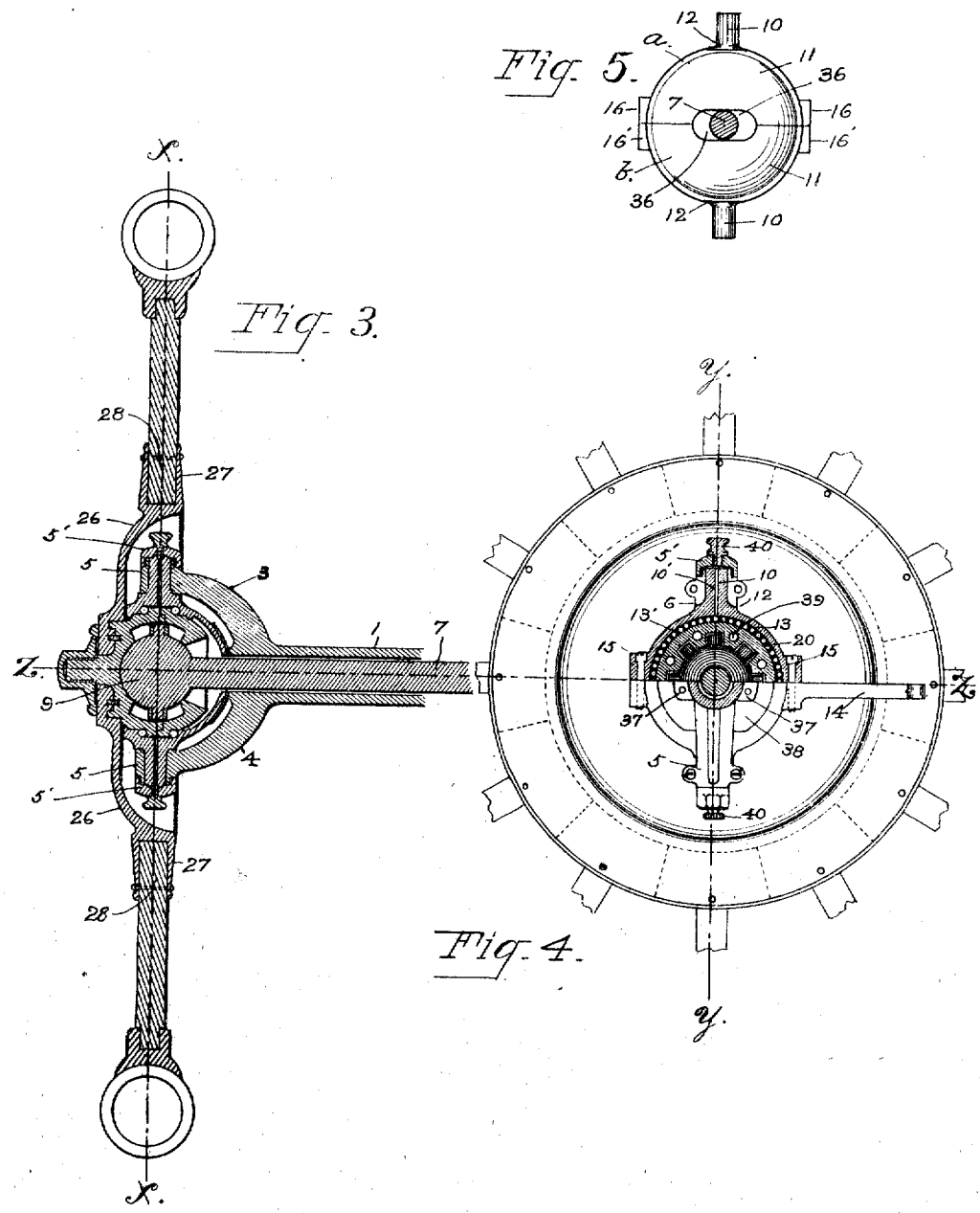

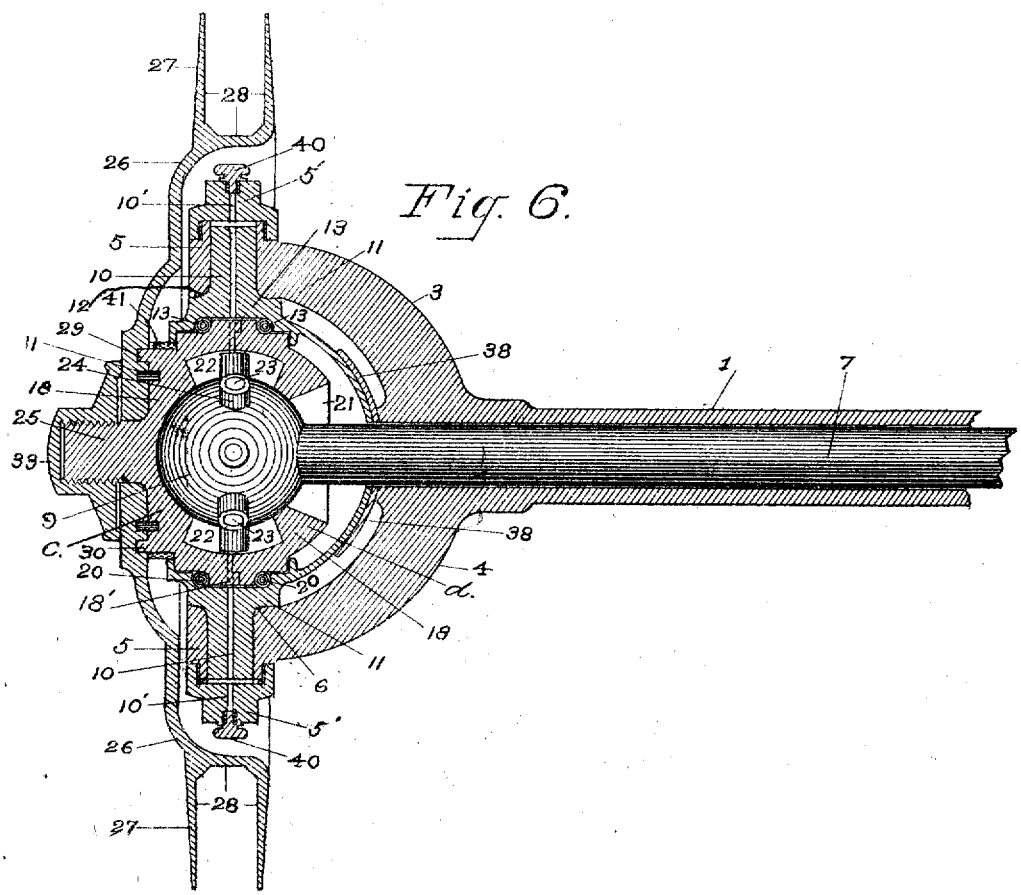

UNITED STATES PATENT OFFICE.

SILAS V. DUSSEAU, OF ERIE, MICHIGAN.

COMBINED DRIVING AND STEERING WHEEL FOR AUTOMOBILE-AXLES.

No. 926,929.　　　Specification of Letters Patent.　　　Patented July 6, 1909.

Application filed July 27, 1908. Serial No. 445,460.

*To all whom it may concern:*

Be it known that I, SILAS V. DUSSEAU, a citizen of the United States, residing at Erie, in the county of Monroe and State of Michigan, have invented a new and useful Improvement in Combined Driving and Steering Wheels for Automobile-Axles.

My invention relates to combined driving and steering wheels for an automobile axle, and has for its object to provide an automobile axle with wheels that are adapted to both drive and steer the vehicle. I accomplish these objects by the construction and combination of parts as hereinafter described and illustrated in the drawings, in which—

Figure 1 is a top view of an axle equipped with driving and steering wheels constructed in accordance with my invention. Fig. 2 is a view of the outer side of one of the wheels of the axle shown in Fig. 1. Fig. 3 is a diametric section of a wheel and a vertical section on line $y$—$y$ of Fig. 4 of one end fork and a broken away portion of an axle, constructed and assembled in accordance with my invention. Fig. 4 is an inner side view of a wheel hub, showing the upper half of the compound pivoted ball and socket driving hub and pivoted socket bearing of the hub, in vertical section on line $x$—$x$ of Fig. 3 to the parting line $z$—$z$ of the sections of the socket bearing. Fig. 5 is an inner side elevation of a bearing casing for a wheel hub, and Fig. 6 is an enlarged section on line $y$—$y$ of Fig. 4.

In the drawings 1 designates a tubular axle having central of its length a gear case 2, and at each end a bearing fork consisting of the arms 3 and 4 which extend in a semicircle and at their outer end portions are provided with the alined box bearings 5, and with the thrust bearings 6 at right angles to the axes of the bearings 5.

Within the bore of the axle, extending each way from the gear case, are journaled the driving shafts 7, which at their inner ends are provided with gears 8 that are adapted to be differentially driven by a driving shaft 7'. The outer end of each shaft is provided with a ball terminal 9, the center of which is in line with the axes of the bearings 5.

In the bearings 5 of each axle fork are journaled the trunnions 10, of a spheroidal bearing casing 11, the trunnions being provided with the shoulders 12 which engage the bearings 6.

The casing 11 has a spherical socket and an annular groove 13 around the socket, and a steering arm 14 which projects radially between the trunnions and 90° therefrom. The steering arms 14 are connected by a steering bar 14', by which the casings 11 are simultaneously rotated on their trunnions through equal arcs. For convenience of assembling, the casing is divided on the line $z$—$z$ into sections $a$ and $b$ as shown in Fig. 5, which are secured together by the bolts 15 extending through the complementary ears 16 and 16' of the sections.

Within each of the bearing casings 11 are rotatably mounted the spheroidal hubs 18 of the wheels 19, each hub outwardly having an annular projection 18' complementary to the bearing groove 13 of the casing 11, and forming therewith the annular ball grooves 13' in which are mounted the balls 20, forming a ball bearing for the hub. The body of the hub is provided with a spherical socket of a diameter to receive and form a bearing for the ball terminal 9 of the shaft 7. The hub is formed in two sections $c$ and $d$ to adapt it for assembling around the ball terminal 9, the section $d$ being provided with a conically reduced opening 21 through which the shaft 7 extends, and assuming that the poles of the hub are in line with the axis of the shaft, the hub is provided at uniform intervals with the meridional incuts 22 extending a limited number of degrees on each side of the equatorial plane of the socket of the hub, which then coincides with the equatorial plane of the ball terminal.

The ball terminals 9 of the shafts 7 are each provided with the pins 23 projecting radially into the incuts 22, in opposite pairs, at equal intervals in the equatorial planes of the terminal. The pins 23 preferably are provided with the antifriction rollers 24, which are of diameters to freely move through the incuts 22.

Opposite the polar opening 21, each hub 18 has an axial extension 25 upon which is mounted and fixedly secured the hub disk 26, having an axial opening to receive the extension 25 of the hub, and a rim 27 provided with an annular spoke groove 28. The central portion of the hub disk is dished outwardly to receive the hub 18, with the spoke groove 28 in the plane of the bearing groove 13, of the bearing casing 11. The disk 26 is provided with the annular groove 29, which receives an annular tongue 30 on the hub and is provided with the dowels 31 which extend into the hub. The extension 25 of the hub is threaded and provided with a cap nut 33, which, when the nut is run on the extension, secures the hub to the hub disk with the dowels of the disk in engagement with the hub.

The sections $a$ and $b$ of the bearing casings 11 are spherical, and opposite the conical openings 21 of the hubs 18, they are provided with the elongated slots 36, through which the shafts 7 extend, and around the shafts there are secured to the ears 37 of the axle forks, between the arms of the fork bearings, the dust shields 38, which spherically coincide with the outer faces of the sections $a$ and $b$ of the bearing casings 11, and are of dimensions to form closures for the slots 36 of the sections $a$ and $b$, at whatever angle the axes of the hubs 18 may be to the axes of the shafts 7.

The sections $c$ and $d$ of the hubs are joined together with the dowels 39, and their joint faces are preferably formed complementary to fit one into the other. When the sections of a hub are assembled in its casing 11 with the balls 20, the balls lock the sections together against separation.

The outer ends of the bearings 5 are threaded and provided with the screw caps 5', and axially through the trunnions 10 and caps 5 of the casings are provided the oil ducts 10', by which the ball bearing 20 and all the parts are lubricated, and the caps 5' are provided with the screw plugs 40, the upper one of which is removed for the introduction of the oil, and by removing the lower plug 5' the whole bearing may be flushed to cleanse it. Thus constructed, when the shafts 7 are revolved by the driving shaft, the rollers 24 of the pins 23 of the ball terminals 9, engage the sides of the incuts 22 of the hubs 18 in the direction of the revolution of the terminals, and revolve the hubs and the wheels 19 with the shafts. If the planes of the wheels are at right angles to the axes of the shafts 7, all of the rollers 24 will engage the hubs central of the lengths of the incuts 22 of the hubs, and at right angles to the sides of the incuts, and in this position the equatorial planes of the hubs and the ball terminals will coincide, and the wheels will drive the vehicle straight forward or backward according to the direction of revolution of the shaft 7. If, however, the casings 11 are turned on the bearings 5 of the axle forks by the steering bar 14, with the axes of the hubs respectively intersecting the axes of the ball terminals of the shaft at the centers of the terminals, the equatorial plane of the hubs will intersect the equatorial planes of the ball terminals at the same angle. In this position when the shafts revolve, the wheels are revolved in the equatorial planes of the hubs, while the rollers of the pins 23 of the terminals, traveling always in the equatorial planes of the terminals are constantly changing their position relative to their respective incuts, and are always in such balanced relation as a whole to the hubs that the movement of the rollers through the incuts produces a constant equally applied force to revolve the wheels in the equatorial planes of the hubs, and propel the vehicle.

The incuts 22 of each hub are of uniform width to loosely receive the rollers 24, which when engaged with the sides of the incuts in the direction of revolution of the ball terminal, are free from the opposite sides of the incuts, and the sides of each opposite pair of incuts are parallel with the meridional plane of the hub that is central between their sides, and at right angles to the equatorial plane of the hub.

By reason of the radial pins of a ball terminal extending into the incuts 22 of the surrounding hub, the ball terminal and the hub revolve as one, while the incuts 22 allow the hub to be turned by the casing a limited number of degrees on the terminal as a pivot, with the axis of the hub intersecting the axis of the ball terminal at the common center of the ball and the hub, and both in the same plane, and intersecting the axis of the trunnions of the casing at right angles. Thus constructed, when the equatorial planes of a ball terminal and its inclosing hub coincide, the hub and the terminal revolve together on a common axis in the same direction. When their equatorial planes intersect, they revolve together each in its own equatorial plane, the incuts permitting the relative shifting of the pins in the incuts necessary to the difference of direction of revolution, and it is manifest that the pins are always in balanced relation on opposite sides of the equatorial plane of the hub, whereby the power of the shaft is applied in the direction of revolution of the hub.

By providing the running gear of an automobile with a front axle and wheels constructed in accordance with my invention and connecting the driving shaft with the motor, the wheels of the front axle as well as the wheels of the rear axle are made adapted to drive the vehicle, while their capacity for steering it, by reason of their being also drivers, is increased.

By the construction shown and described, the load on the axle 1 is primarily supported by the bearings 6 of the axle forks, on the bearings 12 of the hub casings 11, and secondarily on the ball bearings 20 of the casings of the hubs, and the trunnions 10 of the hub casings being in vertical lines that are diametric of the rims of the wheels and central through the bearings 6 and 12, it is manifest that the load is directly supported on the wheels without any leverage of the wheels on the bearings, such as occurs when the wheels are mounted on journals extending outside and at right angles to the fork bearings. It is also apparent, (the load being supported as described) that no part of the load is sustained by the ball terminals of the shafts, which being concentric to the ball bearings 20 are left free of all load stress to perform their sole functions of revolving the wheels.

What I claim to be new is—

1. In an automobile the combination with a tubular axle, having a pair of fork arms extending therefrom in the vertical longitudinal plane of the axle, said fork arms being provided with vertically alined bearings, of a driving shaft journaled in the axle and having a ball terminal extending between the fork arms with its center in line with the axes of the fork bearings, said ball terminal having a series of pins extending radial to the axis of the ball and the shaft, in diametric pairs, in the equatorial plane of the ball; a spheroidal casing having trunnions journaled in the fork bearings, an inner bearing concentric to the ball terminal, and an arm radial to the casing between the trunnions; and a traction wheel having a spheroidal hub journaled in the bearing of the casing, said hub having a spheroidal socket to receive the ball terminal of the shaft, interior incuts to receive the pins of the ball terminal, and a conical polar opening, as set forth, adapted to permit rotation of the casing and the hub on the trunnions of the casing and on the ball terminal through an arc, by the arm of the casing, and the revolving of the hub in the casing by the shaft, whether the axis of the hub is in line with or intersects the common axis of the ball terminal and the shaft.

2. In an automobile the combination with a tubular axle, having a pair of fork arms extending therefrom in the vertical longitudinal plane of the axle, said fork arms being provided with vertically alined bearings, of a driving shaft journaled in the axle and having a ball terminal extending between the fork arms with its center in line with the axes of the fork bearings, said ball terminal having a series of pins extending radial to the axis of the ball and the shaft, in diametric pairs, in the equatorial plane of the ball; a traction wheel having an outwardly dished hub disk, and an axial spheroidal hub extending inwardly, said hub being provided with a spherical socket, interior incuts, and a conical polar opening, as set forth, and being formed in sections adapted to be assembled around the ball trunnion with the shaft extending through the polar opening, and with the pins of the ball terminal extending into the incuts, and having outer annular ball bearings concentric to the axis of the hub, one on each section of the hub, a sectional casing adapted to be assembled around the hub, and having inner ball bearings complementary to the ball bearings of the hub, diametric trunnions journaled in the bearings of the fork, and a radial arm, as set forth, and balls between the ball bearings of the hub and the casing.

In witness whereof I have hereunto signed my name in the presence of two subscribing witnesses, this 16th day of July, 1908.

SILAS V. DUSSEAU.

In presence of—
RICHARD D. WATSON,
R. E. HELM.